(12) United States Patent
Song et al.

(10) Patent No.: US 10,090,905 B2
(45) Date of Patent: Oct. 2, 2018

(54) METHOD AND APPARATUS FOR TRANSMITTING PILOT IN MULTI-ANTENNA COMMUNICATION SYSTEM, AND METHOD AND APPARATUS FOR ALLOCATING PILOT IN MULTI-ANTENNA COMMUNICATION SYSTEM

(71) Applicant: Electronics and Telecommunications Research Institute, Daejeon (KR)

(72) Inventors: Young Seog Song, Daejeon (KR); Jun Hwan Lee, Seoul (KR); Juho Park, Daejeon (KR); Joonwoo Shin, Daejeon (KR); Eun-Young Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 14/982,618

(22) Filed: Dec. 29, 2015

(65) Prior Publication Data

US 2016/0191137 A1    Jun. 30, 2016

(30) Foreign Application Priority Data

Dec. 29, 2014 (KR) .................. 10-2014-0192656
Dec. 22, 2015 (KR) .................. 10-2015-0184207

(51) Int. Cl.
*H04W 4/00* (2018.01)
*H04B 7/06* (2006.01)
(Continued)

(52) U.S. Cl.
CPC ......... *H04B 7/0632* (2013.01); *H04B 7/0617* (2013.01); *H04L 5/0048* (2013.01); *H04L 27/2613* (2013.01)

(58) Field of Classification Search
CPC .. H04B 7/0632; H04L 27/2613; H04L 5/0048
See application file for complete search history.

(56) References Cited

U.S. PATENT DOCUMENTS 8,027,243 B2    9/2011  Jin et al.
2004/0100941 A1  5/2004  Lim et al.
(Continued)

FOREIGN PATENT DOCUMENTS

KR    1020050018296 A    2/2005
KR    1020050123041 A    12/2005
KR    1020130075140 A    7/2013

OTHER PUBLICATIONS

Yushi Shen et al., "Channel Estimation in OFDM Systems", Freescale Semiconductor, 2006, pp. 1-16. Freescale Semiconductor, Inc.

*Primary Examiner* — Chi H Pham
*Assistant Examiner* — Fahmida Chowdhury
(74) *Attorney, Agent, or Firm* — William Park & Associates Ltd.

(57) ABSTRACT

A method in which a base station transmits pilot signals in a multiple-antenna communication system is provided. The base station includes some of the plurality of pilot signals distinguished by at least one of time domain symbols, subcarriers, and orthogonal codes in a first set to which a first random number is applied. The base station includes the remaining pilot signals, excluding the pilot signals that are included in the first set, in a second set that uses the same resources as used by the first set and to which a second random number different from the first random number is applied. The base station transmits at least one of the pilot signals that belong to the first set and the second set.

17 Claims, 9 Drawing Sheets

(51) Int. Cl.
*H04L 5/00* (2006.01)
*H04L 27/26* (2006.01)

(56) References Cited

U.S. PATENT DOCUMENTS

| | | | |
|---|---|---|---|
| 2004/0114552 A1* | 6/2004 | Lim | H04B 7/2041 370/324 |
| 2005/0197162 A1* | 9/2005 | Fujishima | H04B 7/0408 455/562.1 |
| 2007/0249402 A1* | 10/2007 | Dong | H04B 7/0408 455/562.1 |
| 2009/0129495 A1 | 5/2009 | Jin et al. | |
| 2009/0168730 A1* | 7/2009 | Baum | H04L 5/0007 370/336 |
| 2009/0296836 A1* | 12/2009 | Su | H04L 25/0204 375/260 |
| 2010/0189189 A1* | 7/2010 | Hoshino | H04B 7/0408 375/267 |
| 2012/0322477 A1* | 12/2012 | Kang | H04B 7/022 455/501 |
| 2013/0065540 A1* | 3/2013 | Takano | H04B 7/0617 455/68 |
| 2013/0163544 A1 | 6/2013 | Lee et al. | |

\* cited by examiner

METHOD AND APPARATUS FOR TRANSMITTING PILOT IN MULTI-ANTENNA COMMUNICATION SYSTEM, AND METHOD AND APPARATUS FOR ALLOCATING PILOT IN MULTI-ANTENNA COMMUNICATION SYSTEM

CROSS-REFERENCE TO RELATED APPLICATION

This application claims priority to and the benefit of Korean Patent Application Nos. 10-2014-0192656 and 10-2015-0184207 filed in the Korean Intellectual Property Office on Dec. 29, 2014 and Dec. 22, 2015, the entire contents of which are incorporated herein by reference.

BACKGROUND OF THE INVENTION (a) Field of the Invention

The present invention relates to a method and an apparatus for transmitting pilots in a multi-antenna communication system. The present invention also relates to a method and an apparatus for allocating pilots in a multi-antenna communication system.

(b) Description of the Related Art

A MIMO (multiple input multiple output) technology has been extensively used to increase a communication capacity in a communication system. A system according to a LTE (long term evolution)-A (advanced) standard that is a cellular mobile communication system standard may transmit 8 streams by using 8 antenna ports.

Data that is beam-formed may be transmitted by sharing OFDM (orthogonal frequency division multiplexing) symbols and subcarrier resources, and pilot signals may also be transmitted through the same beam-forming as the data in the 8 antenna ports. In this regard, the pilot signals (or pilots) may be transmitted along with the data only when the data is transmitted.

Meanwhile, due to a recently rapid increase in wireless traffic, research into an application of a millimeter wave (mmWave) band having an available frequency bandwidth wider than that of a frequency band used in the existing cellular mobile communication to mobile communication has been carried out in a standardization organization such as a 3GPP (3$^{rd}$ generation partnership project) and a mobile communication industry.

Use of a high frequency such as the millimeter wave, etc. may enable a reduction in an antenna size. The reduction in the antenna size may allow a base station to mount a greater number of antennas than the existing number of antennas.

The base station may transmit a plurality of fixed beams or adaptive beams within a sector through a plurality of antennas. The plurality of antennas may also enable to manage a 3D (3 dimensional) beam-forming base station system.

Meanwhile, the base station needs a plurality of pilots to transmit traffic data through a plurality of beams. However, an independent allocation of pilots as many as increased beams may act as an overhead of an entire system, which deteriorates a communication capacity. Therefore, it is important to design and manage pilots.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for configuring (or allocating) a plurality of pilots and a method and apparatus for transmitting the plurality of pilots in a communication system requiring the plurality of pilots since a plurality of data streams are transmitted through spatial multiplexing by using a plurality of antennas.

The present invention has been made in an effort to provide a method and an apparatus for allocating pilots to minimize interference between the pilots according to the number of a plurality of streams when the plurality of streams are multiplexed.

An exemplary embodiment of the present invention provides a method in which a base station transmits pilot signals in a multiple-antenna communication system. The method includes including some of the plurality of pilot signals distinguished by at least one of time domain symbols, subcarriers, and orthogonal codes in a first set to which a first random number is applied; including the remaining pilot signals, excluding the pilot signals that are included in the first set among the plurality of pilot signals, in a second set that uses the same resources as used by the first set and to which a second random number different from the first random number is applied; and transmitting at least one of the pilot signals that belong to the first set and the second set.

A first pilot signal and a second pilot signal that are distinguished by a first orthogonal code among the orthogonal codes among the pilot signals that belong to the second set may use the same resources as a third pilot signal and a fourth pilot signal that are distinguished by the first orthogonal code among the pilot signals that belong to the first set.

The multiple-antenna communication system may transmit multiple beams in a millimeter wave band.

The first orthogonal code may be a Walsh code. The time domain symbols may be OFDM (orthogonal frequency division multiplexing) symbols.

Each of the first random number and the second random number may be a PN (pseudo noise) sequence.

The transmitting may include simultaneously transmitting at least one of the pilot signals that belong to the first set and at least one of the pilot signals that belong to the second set through a plurality of beams.

Another exemplary embodiment of the present invention provides a method in which a base station allocates pilots in a multiple-antenna communication system. The method includes configuring a first pilot set and a second pilot set that use the same resources and are distinguished by different random numbers; and allocating pilots that belong to the first pilot set to data streams that are to be multiple transmitted prior to pilots that belong to the second pilot set.

The allocating of the pilots that belong to the first pilot set to the data streams that are to be multiple transmitted prior to the pilots that belong to the second pilot set may include determining the number of the data streams that are to be multiple transmitted; comparing the determined number and the number of the pilots that belong to the first pilot set; and when the determined number is less or the same than the number of the pilots that belong to the first pilot set, allocating the pilots that belong to the first pilot set as many as the determined number to the data streams that are to be multiple transmitted.

The allocating of the pilots that belong to the first pilot set to the data streams that are to be multiple transmitted prior to the pilots that belong to the second pilot set may further include when the determined number is more than the number of the pilots that belong to the first pilot set, allocating the pilots that belong to the first pilot set to some of the data streams that are to be multiple transmitted; and allocating the pilots that belong to the second pilot set as many as the number of pilots obtained by subtracting the number of the pilots that belong to the first pilot set from the determined number to other data streams among the data streams that are to be multiple transmitted.

The determining of the number of the data streams that are to be multiple transmitted may include receiving channel state information regarding a plurality of beams from a terminal; calculating interference between the plurality of beams based on the channel state information; and determining the number of the data streams that are to be multiple transmitted based on the interference between the plurality of beams.

The receiving of the channel state information regarding the plurality of beams may include transmitting BSI (beam status information)-RS (reference signal) through the plurality of beams; and receiving the channel state information including a CQI (channel quality indicator) measured based on the BSI-RS from a terminal that receives the BSI-RS.

The base station may manage a plurality of distributed antennas.

Yet another exemplary embodiment of the present invention provides a method in which a base station allocates pilots in a multiple-antenna communication system. The method includes configuring a first pilot set and a second pilot set that use the same resources and are distinguished by different random numbers; allocating pilots that belong to the first pilot set and pilots that belong to the second pilot set to a plurality of beams; determining the pilots allocated to the beams for data streams that are to be multiple transmitted among the plurality of beams; and allocating the determined pilots among the pilots that belong to the first pilot set and the second pilot set to the data streams that are to be multiple transmitted.

DETAILED DESCRIPTION OF THE EMBODIMENTS

Figure 1:
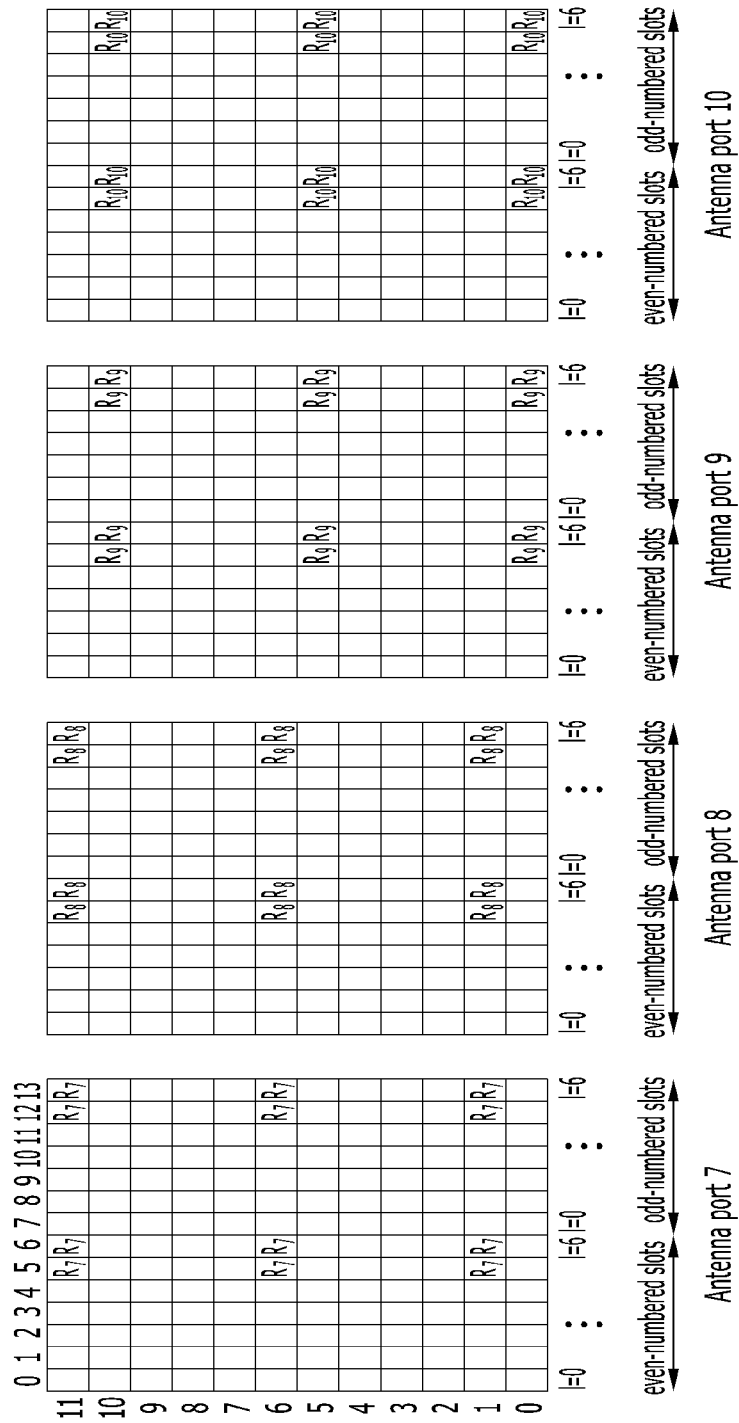
FIG. 1 is a diagram of pilots distinguished by OFDM symbols, subcarriers, and orthogonal codes.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, a terminal may be referred to as a mobile terminal, a mobile station, an advanced mobile station, a high reliability mobile station, a subscriber station, a portable subscriber station, an access terminal, a user equipment, or the like, and may include all or some of functions of the mobile terminal, the mobile station, the advanced mobile station, the high reliability mobile station, the subscriber station, the portable subscriber station, the access terminal, the user equipment, or the like.

In addition, the base station (BS) may designate an advanced base station a high reliability base station (HR-BS), a node B, an evolved node B (eNodeB), an access point, a radio access station, a base transceiver station, an MMR (mobile multihop relay)-BS, a relay station functioning as the base station, a high reliability relay station functioning as the base station, a repeater, a macro base station, a small base station, or the like, and may include all or some of functions of the base station, the advanced base station, HR-BS, the nodeB, the eNodeB, the access point, the radio access station, the base transceiver station, the MMR-BS, the relay station, the high reliability relay station, the repeater, the macro base station, the small base station, or the like.

FIG. 1 is a diagram of pilots distinguished by OFDM symbols, subcarriers, and orthogonal codes.

A single subframe may include even-numbered time slots (hereinafter, 'slot 0') and odd-numbered time slots (hereinafter, 'slot 1') after the slot 0. Each of the slot 0 and the slot 1 may include 7 OFDM symbols in a time axis and 12 subcarriers (0~11) in a frequency axis. That is, 84 (=7×12) REs (resource elements) may be present in each of the slot 0 and the slot 1. In the present specification, 7 OFDM symbols included in the slot 0 may be OFDM symbols 0~6, and 7 OFDM symbols included in the slot 1 may be OFDM symbols 7~13.

In a case where a base station having a plurality of antennas simultaneously transmits data to a plurality of terminals, the base station may need a plurality of pilots (or pilot signals). Since a pilot is a reference for demodulation of a data signal, performance of demodulation may be greatly determined according to noise or interference.

OFDM symbols and subcarrier resources may be allocated to each of the plurality of pilots in order to distinguish the plurality of pilots. For example, as shown in FIG. 1, a pilot corresponding to an antenna port 7 or 8 and a pilot corresponding to an antenna port 9 or 10 may use different resources. That is, the pilot corresponding to the antenna port 7 or 8 and the pilot corresponding to the antenna port 9 or 10 may be distinguished by subcarrier resources.

Meanwhile, pilots sharing the same resources may be distinguished by orthogonal codes. For example, as shown in FIG. 1, the pilot corresponding to the antenna port 7 and the pilot corresponding to the antenna port 8 may use the same resources. The pilot corresponding to the antenna port 7 and the pilot corresponding to the antenna port 8 may be distinguished by orthogonal codes. The pilot corresponding to the antenna port 9 and the pilot corresponding to the antenna port 10 may also use the same resources. The pilot corresponding to the antenna port 9 and the pilot corresponding to the antenna port 10 may be distinguished by orthogonal codes. The plurality of pilot signals for spatial multiplexing may be generated by multiplying the above-described orthogonal codes by pilot sequences. To reduce deterioration of channel estimation performance due to interference, the pilot sequences may use random numbers, for example, PN (pseudo noise) sequences.

Figure 2:
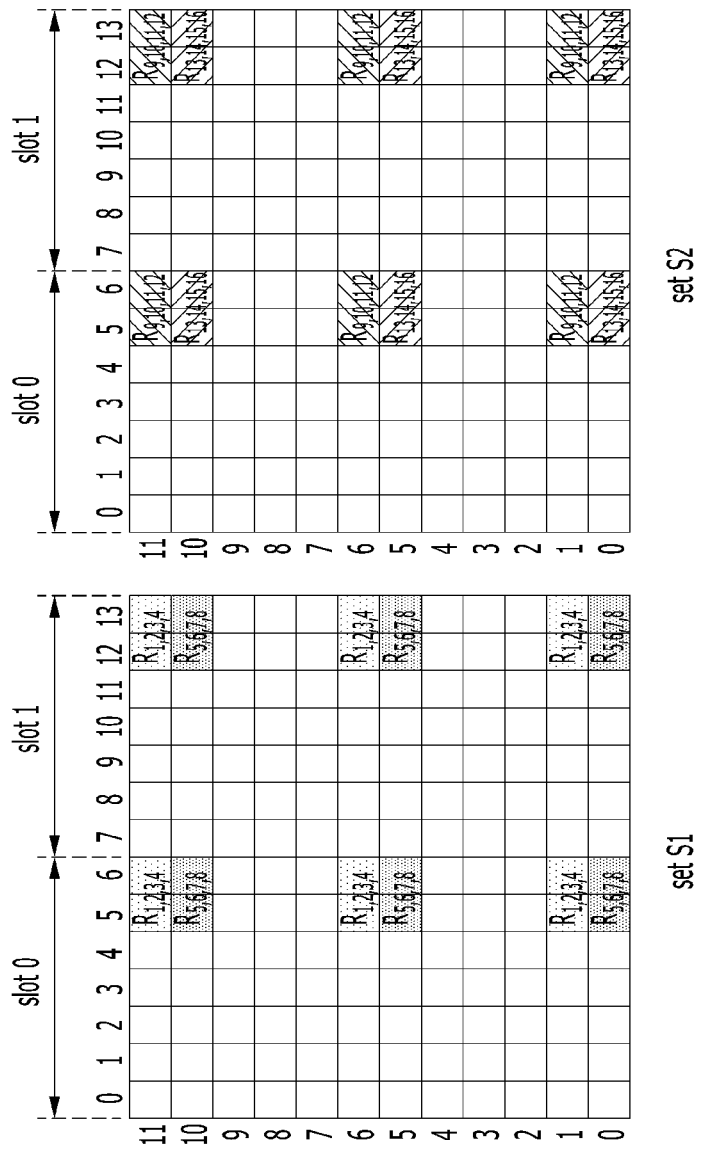
FIG. 2 is a diagram for describing a pilot configuration method according to an exemplary embodiment of the present invention.

FIG. 2 is a diagram for describing a pilot configuration method according to an exemplary embodiment of the present invention.

A base station may configure a plurality of pilots as a plurality of pilot sets. More specifically, FIG. 2 shows a case where the total number of the plurality of pilots is 16, and the base station configures the 16 pilots as 2 pilot sets S1 and S2.

Each of the pilot sets S1 and S2 may include at least one pilot. More specifically, FIG. 2 shows a case where pilots 1~8 that belong to the pilot set S1 are 8, and pilots 9~16 that belong to the pilot set S2 are 8. For example, the pilots that belong to the pilot sets S1 and S2 may be DM (demodulation)-RS (reference signal) that are demodulation reference signals and other reference signals.

The pilots 1~8 that belong to the pilot set S1 may be distinguished from each other by differentiating locations of OFDM symbols and subcarriers or the pilots 1~4 or 5~8 in the same resource locations may be distinguished by differentiating orthogonal codes (or Walsh codes). More specifically, the pilots 1~4 that belong to the pilot set S1 may use the same resources and may be distinguished by different orthogonal codes. Likewise, the pilots 5~8 that belong to the pilot set S1 may use the same resources and may be distinguished by different orthogonal codes. The pilots 1~4 that belong to the pilot set S1 and the pilots 5~8 that belong to the pilot set S1 may be distinguished by OFDM symbols and subcarriers.

The pilots 9~16 that belong to the pilot set S2 may be distinguished from each other by differentiating locations of OFDM symbols and subcarriers or the pilots 9~12 or 13~16 in the same resource locations may be distinguished by differentiating orthogonal codes. Meanwhile, the pilots 9~16 that belong to the pilot set S2 may be located in the same OFDM symbols and the same subcarriers as those of the pilots 1~8 that belong to the pilot set S1 and may use the same orthogonal codes. More specifically, the pilots 9~12 that belong to the pilot set S2 may be located in the same OFDM symbols and the same subcarriers as those of the pilots 1~4 that belong to the pilot set S1 and may use the same orthogonal codes as that of the pilots 1~4 that belong to the pilot set S1. Likewise, the pilots 13~16 that belong to the pilot set S2 may be located in the same OFDM symbols and the same subcarriers as those of the pilots 5~8 that belong to the pilot set S1 and may use the same orthogonal codes as that of the pilots 5~8 that belong to the pilot set S1.

Therefore, resources used by the pilot set S2 and resources used by the pilot set S1 may be the same. The pilots 9~16 that belong to the pilot set S2 may be distinguished from the pilots 1~8 that belong to the pilot set S1 by using different random numbers (e.g. PN sequences) from the pilot set S1. That is, the pilot set S1 and the pilot set S2 may be distinguished by different random numbers (e.g. PN sequences). Random numbers (e.g. PN sequences) used to generate the pilots that belong to the pilot set S1 may be different from random numbers (e.g. PN sequences) used to generate the pilots that belong to the pilot set S2.

If the pilot set S1 and the pilot set S2 use different random numbers (e.g. PN sequences), channel estimation performance with respect to interference may be improved during channel estimation. For example, when a terminal performs channel estimation on the pilot (e.g. 1) that belongs to the pilot set S1, the pilot (e.g. 10) that belongs to the pilot set S2 and uses the same resources as the pilot (e.g. 1) may cause interference to occur. In this regard, since random numbers (e.g. PN sequences) of the pilot set S2 are different from random numbers (e.g. PN sequences) of the pilot set S1, when the terminal adds values obtained by multiplying orthogonal codes by random numbers (e.g. PN sequences) in order to acquire a channel value, interference due to a channel component of the pilot set S2 may be reduced on the average.

The reason why the resources occupied by the pilots that belong to the pilot set S1 and the pilot set S2 are reused is to prevent overhead of a communication system that transmits a plurality of multiple beams from increasing.

Meanwhile, an exemplary embodiment of the present invention may be applied to a mobile communication system (hereinafter "millimeter wave communication system") that operates in a millimeter wave band. The millimeter wave communication system will be described in detail with reference to FIG. 3 below.

Figure 3:
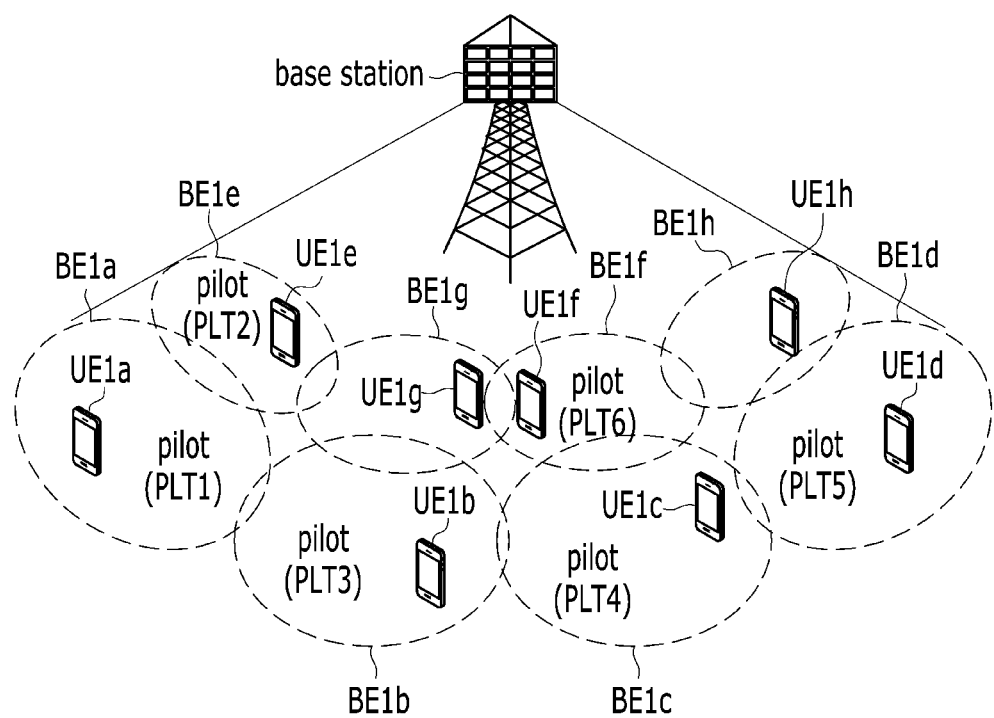
FIG. 3 is a diagram of a mobile communication base station that operates in a millimeter wave band and transmits a plurality of fixing beams according to an exemplary embodiment of the present invention.

FIG. 3 is a diagram of a mobile communication base station that operates in a millimeter wave band and transmits a plurality of fixing beams BE1a~BE1h according to an exemplary embodiment of the present invention.

FIG. 3 shows a case where a base station allocates the same transmission resources to the plurality of fixing beams BE1a~BE1h and transmits pilots and data to a plurality of terminals UE1a-UE1f through the plurality of fixing beams BE1a~BE1h. In this regard, resources allocated to beams may include data resources and pilot resources. FIG. 3 also shows a case where the base station includes 4 pilots PLT1~PLT4 among 8 pilots PLT1~PLT8 in the pilot set S1 and the 4 pilots PLT5~PLT8 in the pilot set S2. That is, a pilot configuration may include S1={PLT1, PLT2, PLT3, PLT4}, and S2={PLT5, PLT6, PLT7, PLT8}.

FIG. 3 shows a case where each of the terminals UE1a-UE1f receives data streams from the base station through multiple transmission (e.g. MU (multi-user)-MIMO) that uses the same resources. A single beam may be transmitted to each of the terminals UE1a, UE1b, UE1c, UE1d, UE1e, and UE1f. The terminals UE1g and UE1h may be excluded from the multiple transmission due to interference caused by adjacent beams.

To this multiple transmission, the base station may use the pilots PLT1, PLT2, PLT3, and PLT4 that belong to the pilot set S1 and may use the pilots PLT5 and PLT6 that belong to the pilot set S2.

Meanwhile, pilots that are to use the same resources as the pilots PLT1, PLT2, PLT3, and PLT4 of the pilot set S1 may be configured among the pilots PLT5, PLT6, PLT7, and PLT8 of the pilot set S2. For example, the pilots PLT5, PLT6, PLT7, and PLT8 of the pilot set S2 may be configured to use the same resources in the order of the pilots PLT1, PLT2, PLT3, and PLT4 of the pilot set S1. That is, the pilots PLT1 and PLT5 may use the same resources, the pilots PLT2 and pilot PLT6 may use the same resources, the pilots PLT3 and PLT7 may use the same resources, and the pilots PLT4 and pilot PLT8 may use the same resources. For another example, among the pilots PLT1, PLT2, PLT3, and PLT4 of the pilot set S1 and the pilots PLT5, PLT6, PLT7, and PLT8 of the pilot set S2, pilots that are to use the same resources may be configured based on different patterns.

Meanwhile, in a case where the pilots PLT5, PLT6, PLT7, and PLT8 of the pilot set S2 and the pilots PLT1, PLT2, PLT3, and PLT4 of the pilot set S1 are configured to use the same resources sequentially, since the pilots PLT1 and PLT5 or the pilots PLT2 and PLT6 use the same resources, interference may be present. However, since a millimeter wave band has characteristics of a high path attenuation and a radio channel having limited scattering, the base station may simultaneously use the pilots (e.g., the pilots PLT1 and PLT5 or the pilots PLT2 and PLT6) without interference in an environment of FIG. 3.

As described above, the environment in which the base station may simultaneously use the pilots that belong to the pilot set S2 and the pilots that belong to the pilot set S1 in the millimeter wave band almost without interference may be possible.

Meanwhile, when the base station transmits multiple beams in the millimeter wave band, since a transmission wave may be sufficiently reflected according to a reflector, interference between the beams may be unavoidable in a downtown region. A method of minimizing such interference between beams will now be described with reference to FIG. 4.

Figure 4:
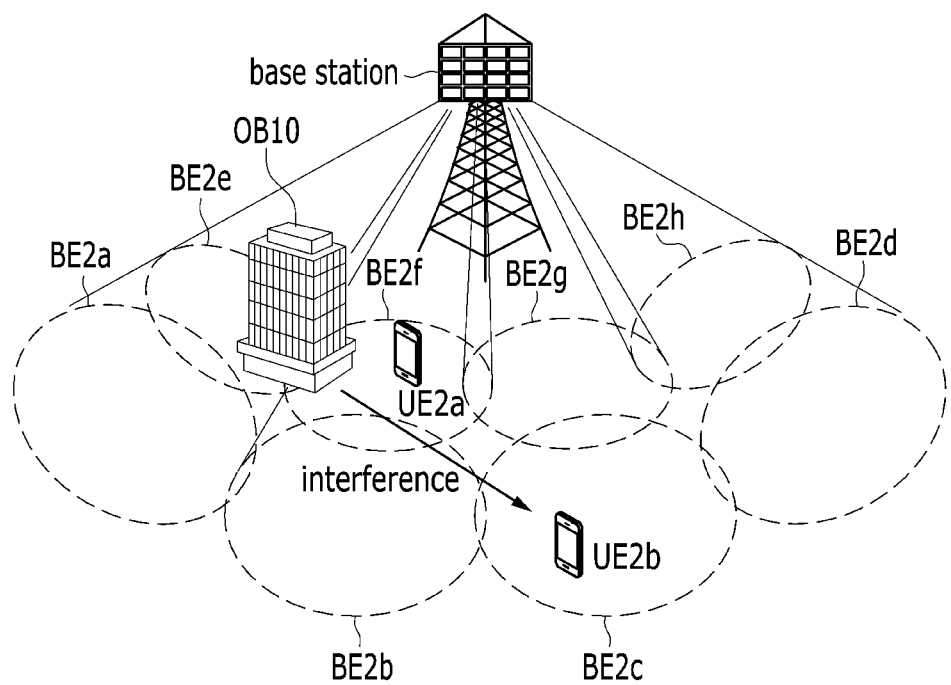
FIG. 4 is a diagram of interference between beams that occurs by a reflector in a case where a base station transmits multiple beams in a millimeter wave band.

FIG. 4 is a diagram of interference between beams that occurs by a reflector in a case where a base station transmits multiple beams in a millimeter wave band. More specifically, FIG. 4 shows a case where the base station covers a service region through a plurality of fixing beams BE2a-BE2h.

A terminal UE2b may receive interference since the beam BE2f transmitted to a terminal UE2a is reflected from a building OB10. As described above, since a case where the base station performs multiple transmission in a channel environment in which interference between beams is inevitable may generate, a scheduler of the base station may need to measure intensity of interference between beams.

To measure interference between beams, a beam reference signal (e.g., a BSI (beam status information)-RS (reference signal)) that is periodically transmitted through each of the plurality of fixing beams BE2a-BE2h may be used.

A terminal may feedback intensity of at least one BSI-RS received by the terminal or a CQI (channel quality indicator) of at least one beam received by the terminal to the base station.

In a case where interference between beams is inevitable, the scheduler of the base station may predict interference between beams by using information (e.g. the intensity of the BSI-RS or the CQI of the beam) fed back from the terminal(s) and may manage (or control) a data transmission speed of each of the fixing beams BE2a-BE2h based on the predicted interference between beams.

In an environment of FIG. 4, even if the pilot set S1 and the pilot set S2 use different random numbers (e.g. PN sequences), although deterioration of channel estimation performance due to interference between pilots that use the same resources is unavoidable, the base station may minimize deterioration of performance owing to such scheduling when allocating pilots that belong to the pilot set S1 and the pilot set S2. In a case where the base station transmits signals to terminals by using beams that interfere with each other, since it is impossible for the terminals to receive the signals due to interference between beams or receiving performance of the terminals deteriorates, the base station may control (e.g. down control) a data transmission rate of the fixing beams BE2a-BE2h in accordance with interference intensity, thereby increasing a capacity of an entire system. In a case where the scheduler of the base station allocates pilots and data to a plurality of beams among the plurality of fixing beams BE2a-BE2h for multiple transmission, the scheduler of the base station may select a transmission beam set to minimize interference in consideration of interference between beams. A method of selecting beams to minimize such interference will now be described with reference to FIGS. 5 and 6.

Figure 5:
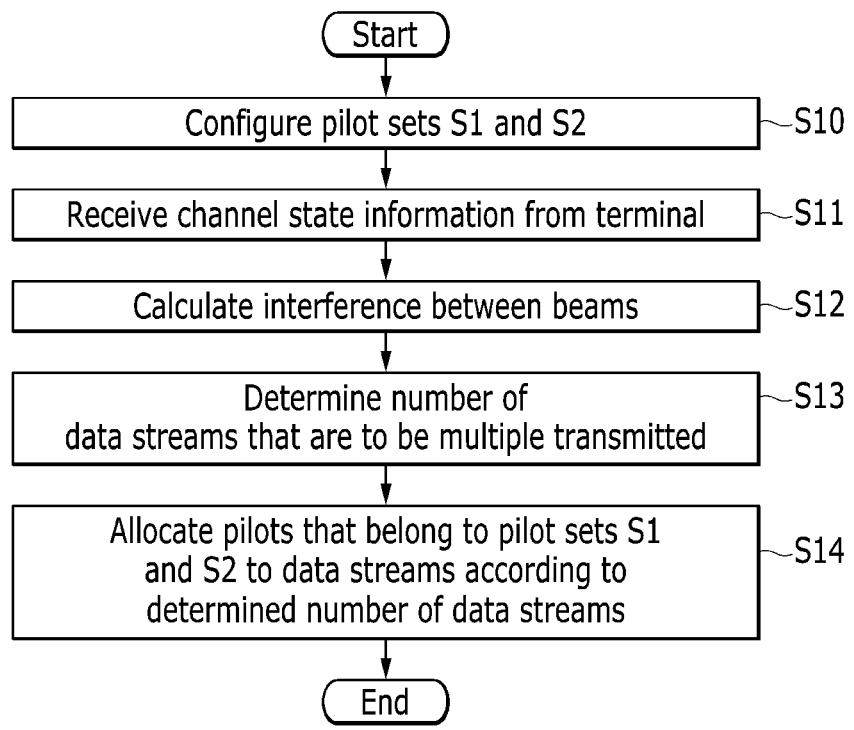
FIG. 5 is a diagram for describing a method of allocating pilots during spatial multiplexing transmission according to an exemplary embodiment of the present invention.

FIG. 5 is a diagram for describing a method of allocating pilots during spatial multiplexing transmission according to an exemplary embodiment of the present invention.

A base station may configure the pilot set S1 and the pilot set S2 that use the same resources and are distinguished by different random numbers (e.g., PN sequences) (S10).

A scheduler of the base station may receive a feedback of channel state information of each fixing beam from terminal(s) (S11). More specifically, the scheduler of the base station may receive a CQI of each beam from the terminal(s). In this regard, the CQI of each beam may be measured by the terminal(s) based on each beam reference signal (e.g., a BSI-RS) that has no interference between beams and is periodically transmitted.

The scheduler of the base station may calculate interference between beams based on the CQI of each beam (S12).

The scheduler of the base station may determine beams (or the number of beams) that are to be simultaneously transmitted to the terminal(s) by using the same resources based on the calculated interference between beams (S13). More specifically, the scheduler of the base station may determine the number of data streams that are to be multiple transmitted through multiple beams.

The scheduler of the base station may allocate pilots that belong to the pilot set S1 and the pilot set S2 to the beams (or the data streams) determined in S13 according to the number of beams (or the number of data streams) determined in S13 (S14). For convenience of description, a size of the pilot set S1 is Np1, a size of the pilot set S2 is Np2, and the number of beams (or data streams) determined in S13 is Np3. The scheduler of the base station may compare Np3 and Np1. More specifically, if Np3 is equal to or smaller than Np1, the scheduler of the base station may sequentially allocate an Np3 number of pilots among the pilots that belong to the pilot set S1 to an Np3 number of beams (or data streams) determined in S13.

If Np3 exceeds Np1, the scheduler of the base station may allocate an Np1 number of pilots that belong to the pilot set S1 to an Np1 number of beams (or data streams) among the Np3 number of beams (or data streams) determined in S13. The scheduler of the base station may allocate an (Np3-Np1) number of pilots among an Np2 number of pilots that belong to the pilot set S2 to remaining (Np3-Np1) number of beams (or data streams) among the Np3 number of beams (or data streams) determined in S13.

Figure 6:
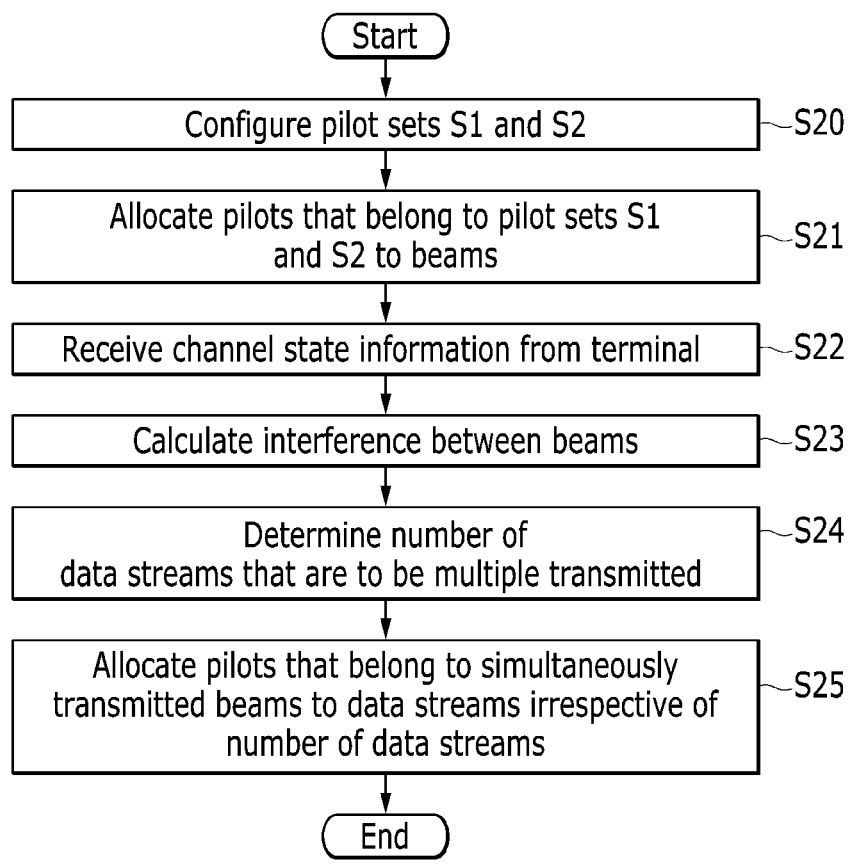
FIG. 6 is a diagram for describing a method of allocating pilots during spatial multiplexing transmission according to another exemplary embodiment of the present invention.

FIG. 6 is a diagram for describing a method of allocating pilots during spatial multiplexing transmission according to another exemplary embodiment of the present invention. The method shown in FIG. 6 is different from the method shown in FIG. 5 in that the method of FIG. 6 allocates pilots that belong to the pilot sets S1 and S2 to beams in advance.

A base station may configure the pilot set S1 and the pilot set S2 that use the same resources and are distinguished by different random numbers (e.g., PN sequences) (S20).

A scheduler of the base station may allocate each pilot that belongs to the pilot sets S1 and S2 to each fixing beam in advance (S21). More specifically, the scheduler of the base station may allocate a single pilot that belongs to the pilot sets S1 and S2 to a single fixing beam.

The scheduler of the base station may receive a feedback of channel state information of each fixing beam from terminal(s) (S22). More specifically, the scheduler of the base station may receive a CQI of each beam from the terminal(s). In this regard, the CQI of each beam may be measured by the terminal(s) based on each beam reference signal (e.g., a BSI-RS) that has no interference between beams and is periodically transmitted.

The scheduler of the base station may calculate interference between beams based on the CQI of each beam (S23).

The scheduler of the base station may determine beams (or the number of beams) that are to be simultaneously transmitted to the terminal(s) by using the same resources based on the calculated interference between beams (S24). More specifically, the scheduler of the base station may determine the number of data streams that are to be multiple transmitted through multiple beams.

The scheduler of the base station may allocate pilots that belong to multiple beams that are to be simultaneously transmitted to the data streams determined in S24 irrespective of the number of data streams determined in S24 (S25).

For example, it is assumed that the scheduler of the base station determines to respectively allocate a first pilot and a second pilot among pilots that belong to the pilot sets S1 and S2 to a first beam and a second beam among a plurality of beams in S21 and multiple transmit the first beam and the second beam among the plurality of beams in S24. Under the assumption, the scheduler of the base station may allocate the first pilot allocated to the first beam to a data stream corresponding to the first beam among data streams that are to be multiple transmitted through the first beam and the second beam and may allocate the second pilot allocated to the second beam to a data stream corresponding to the second beam among the data streams that are to be multiple transmitted through the first beam and the second beam.

Meanwhile, an exemplary embodiment of the present invention may also be applied to a distributed antenna mobile communication system that operates in a millimeter wave band. The distributed antenna mobile communication system will now be described with reference to FIG. 7.

Figure 7:
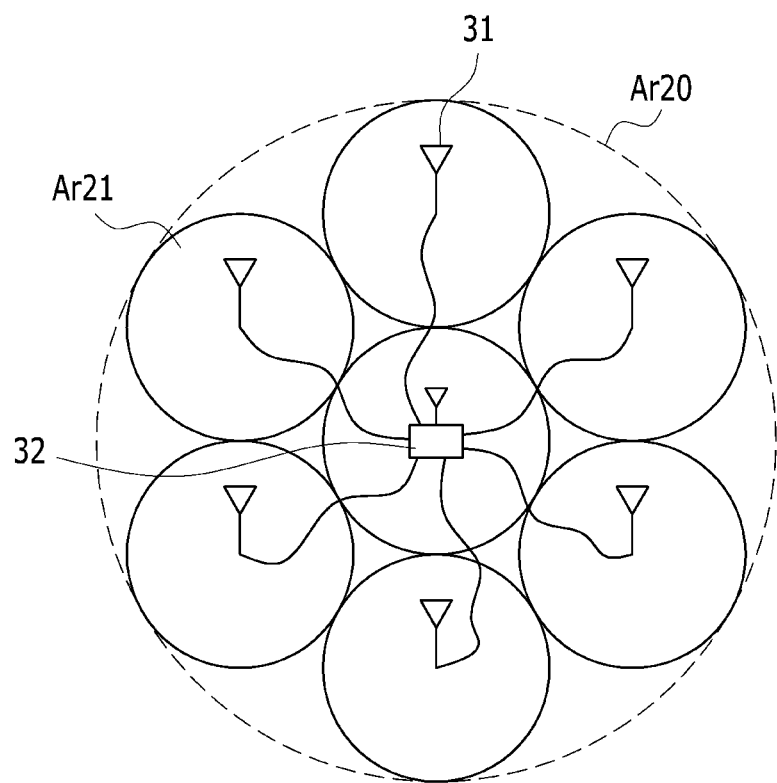
FIG. 7 is a diagram of a base station that operates in a millimeter wave band and manages a distributed antenna according to an exemplary embodiment of the present invention.

FIG. 7 is a diagram of a base station that operates in a millimeter wave band and manages a distributed antenna according to an exemplary embodiment of the present invention.

A wireless service area Ar20 may include a plurality of sub areas Ar21 that are distinguished by beams radiated from a plurality of antennas in an omni direction. In this regard, a service area Ar20 may be a single sector taken charge by the base station.

Due to a rapid increase in wireless traffic, the base station may manage a plurality of distributed antennas. More specifically, the base station (hereinafter "distributed antenna base station") that manages the plurality of distributed antennas may include a plurality of RF (Radio Frequency) modules 31 and a digital signal processing module 32 that processes a digital signal. Each of the RF modules 31 connected to the distributed antennas may be installed in each of the sub areas Ar21. The digital signal processing module 32 may be disposed in one location. Each of the RF modules 31 and the digital signal processing module 32 may interwork with each other. For convenience of description, the "RF modules 31 connected to the distributed antennas" are referred to as the "distributed antennas 31" in FIG. 7.

The distributed antenna base station shown in FIG. 7 may allocate pilots that belong to the pilot sets S1 and S2 to each of the distributed antennas 31 by using a method similar to the method shown in FIG. 5.

More specifically, the distributed antenna base station may configure the pilot set S1 and the pilot set S2.

The distributed antenna base station may receive a feedback of channel state information (e.g., CQIs of the distributed antennas 31) of each of the distributed antennas 31 from terminal(s).

The distributed antenna base station may calculate interference between the distributed antennas 31 based on the received channel state information.

The distributed antenna base station may determine the distributed antennas 31 (or the number of the distributed antennas 31) that are to perform multiple transmission (using the same resources) based on the interference between the distributed antennas 31.

The distributed antenna base station may allocate the pilots that belong to the pilot sets S1 and S2 to data streams that are to be multiple transmitted through the determined distributed antennas 31 according to the determined number of the distributed antennas 31. For convenience of description, a size of the pilot set S1 is Np1, a size of the pilot set S2 is Np2, and the determined number of the distributed antennas 31 is Np4. More specifically, if Np4 is equal to or smaller than Np1, the distributed antenna base station may sequentially allocate an Np4 number of pilots among the pilots that belong to the pilot set S1 to data streams that are to be multiple transmitted through the determined Np4 number of the distributed antennas 31.

If Np4 exceeds Np1, the distributed antenna base station may allocate an Np1 number of pilots that belong to the pilot set S1 to an Np1 number of data streams among the data streams that are to be multiple transmitted through the determined Np4 number of the distributed antennas 31. The distributed antenna base station may allocate an (Np4-Np1) number of pilots among an Np2 number of pilots that belong to the pilot set S2 to remaining (Np4-Np1) number of data streams among the data streams that are to be multiple transmitted through the determined Np4 number of the distributed antennas 31.

Alternatively, the distributed antenna base station shown in FIG. 7 may allocate the pilots that belong to the pilot sets S1 and S2 to each of the distributed antennas 31 by using a method similar to the method shown in FIG. 6.

More specifically, the distributed antenna base station may allocate each of the pilots that belong to the configured pilot sets S1 and S2 to each of the distributed antennas 31 in advance.

The distributed antenna base station may calculate interference between the distributed antennas 31 based on the feedback of channel state information (e.g. the CQI of each of the distributed antennas 31) received from the terminal(s).

The distributed antenna base station may determine the distributed antennas 31 (or the number of the distributed antennas 31) that are to perform multiple transmission (using the same resources) based on the interference between the distributed antennas 31.

The distributed antenna base station may allocate the pilots that are allocated to the determined distributed antennas 31 in advance to the data streams that are to be multiple transmitted through the determined distributed antennas 31 irrespective of the determined number of the distributed antennas 31.

Figure 8:
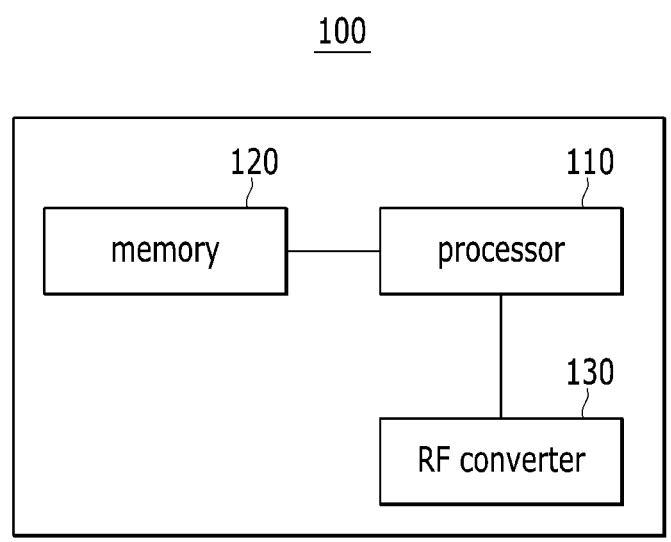
FIG. 8 is a diagram of a base station according to an exemplary embodiment of the present invention.

FIG. 8 is a diagram of a base station 100 according to an exemplary embodiment of the present invention The base station 100 may include a processor 110, a memory 120, and an RF converter 130.

The processor 110 may be configured to implement functions, procedure, and methods that are described in relation to a base station or TP in the present specification. The processor 110 may also control each constitutional element of the base station 100.

The memory 120 may be connected to the processor 110 and may store various types of information relating to an operation of the processor 110.

The RF converter 130 may be connected to the processor 110 and may transmit or receive a wireless signal.

Figure 9:
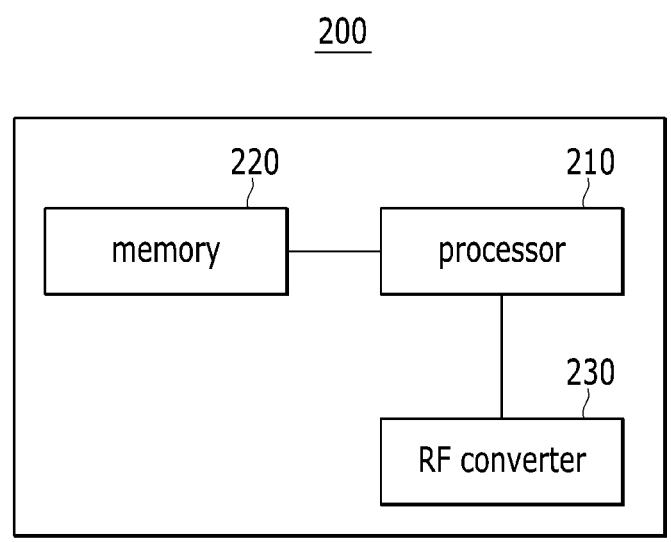
FIG. 9 is a diagram of a terminal according to an exemplary embodiment of the present invention.

FIG. 9 is a diagram of a terminal 200 according to an exemplary embodiment of the present invention The terminal 200 may include a processor 210, a memory 220, and an RF converter 230.

The processor 210 may be configured to implement functions, procedure, and methods that are described in relation to the terminal 200 in the present specification. The processor 210 may also control each constitutional element of the terminal 200.

The memory 220 may be connected to the processor 210 and may store various types of information relating to an operation of the processor 210.

The RF converter 230 may be connected to the processor 210 and may transmit or receive a wireless signal.

Meanwhile, the exemplary embodiment of the present invention has been described by using a case where a base station transmits data but this is merely an example. The exemplary embodiment of the present invention may also be applied to a case where a base station transmits a control signal.

Meanwhile, the exemplary embodiment of the present invention has been described by using a case where a base station configures the two pilot sets S1 and S2 but this is merely an example. The exemplary embodiment of the present invention may also be applied to a case where a base station configures three or more pilot sets.

Meanwhile, the exemplary embodiment of the present invention has been described by using a communication system that operates in a radio channel environment having limited scattering such as a millimeter wave band but this is merely an example. The exemplary embodiment of the present invention may also be applied to a communication system that operates in a frequency band other than the millimeter wave band.

Meanwhile, the exemplary embodiment of the present invention has been described by using a system that uses OFDM symbols but this is merely an example. The exemplary embodiment of the present invention may also be applied to a system that uses time domain symbols other than OFDM symbols.

According to an exemplary embodiment of the present invention, a multiple-antenna communication system requiring a plurality of pilots may allocate the pilots by using a plurality of pilot sets that use the same resources, thereby reducing overhead of the pilots.

According to an exemplary embodiment of the present invention, an allocation order of pilots may be designated such that interference between the pilots may be minimized during multiple transmission of a plurality of data streams, thereby preventing deterioration of channel estimation performance of the pilots.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a base station transmits pilot signals in a multiple-antenna communication system, the method comprising:

including some of the plurality of pilot signals distinguished by at least one of time domain symbols, subcarriers, and orthogonal codes in a first set to which a first random number is applied;

including the remaining pilot signals, excluding the pilot signals that are included in the first set among the plurality of pilot signals, in a second set that uses the same resources as used by the first set and to which a second random number different from the first random number is applied; and transmitting at least one of the pilot signals that belong to the first set and the second set, wherein the multiple-antenna communication system transmits multiple beams, wherein interference between the multiple beams is calculated prior to allocating the pilot signals to data streams being multiple-transmitted, and wherein a first pilot signal and a second pilot signal that are distinguished by a first orthogonal code among the orthogonal codes among the pilot signals that belong to the second set use the same resources as a third pilot signal and a fourth pilot signal that are distinguished by the first orthogonal code among the pilot signals that belong to the first set.

2. The method of claim 1, wherein the multiple-antenna communication system transmits the multiple beams in a millimeter wave band, the first orthogonal code is a Walsh code, the time domain symbols are OFDM (orthogonal frequency division multiplexing) symbols, and each of the first random number and the second random number is a PN (pseudo noise) sequence.

3. The method of claim 1, wherein the transmitting includes: simultaneously transmitting at least one of the pilot signals that belong to the first set and at least one of the pilot signals that belong to the second set through a plurality of beams.

4. A method in which a base station allocates pilots in a multiple-antenna communication system, the method comprising:

configuring a first pilot set and a second pilot set that use the same resources and are distinguished by different random numbers; and allocating pilots that belong to the first pilot set to data streams that are to be multiple transmitted prior to pilots that belong to the second pilot set B, wherein the multiple-antenna communication system transmits multiple beams, wherein interference between the multiple beams is calculated prior to allocating the pilot signals to the data streams being multiple-transmitted, and wherein the allocating of the pilots that belong to the first pilot set to the data streams that are to be multiple transmitted prior to the pilots that belong to the second pilot set includes:
determining the number of the data streams that are to be multiple transmitted;
comparing the determined number and the number of the pilots that belong to the first pilot set; and
when the determined number is less or the same than the number of the pilots that belong to the first pilot set, allocating the pilots that belong to the first pilot set as many as the determined number to the data streams that are to be multiple transmitted.

5. The method of claim 4, wherein the allocating of the pilots that belong to the first pilot set to the data streams that are to be multiple transmitted prior to the pilots that belong to the second pilot set further includes:
when the determined number is more than the number of the pilots that belong to the first pilot set, allocating the pilots that belong to the first pilot set to some of the data streams that are to be multiple transmitted; and
allocating the pilots that belong to the second pilot set as many as the number of pilots obtained by subtracting the number of the pilots that belong to the first pilot set from the determined number to other data streams among the data streams that are to be multiple transmitted.

6. The method of claim 4, wherein the determining of the number of the data streams that are to be multiple transmitted includes:
receiving channel state information regarding a plurality of beams from a terminal;
calculating interference between the plurality of beams based on the channel state information; and
determining the number of the data streams that are to be multiple transmitted based on the interference between the plurality of beams.

7. The method of claim 4, wherein the random number is a PN (pseudo noise) sequence.

8. The method of claim 4, wherein the configuring of the first pilot set and the second pilot set includes:
including some of a plurality of pilots distinguished by at least one of time domain symbols, subcarriers, and orthogonal codes in the first pilot set; and
including the remaining pilots, excluding the pilots that are included in the first pilot set among the plurality of pilots, in the second pilot set.

9. The method of claim 6, wherein the receiving of the channel state information regarding the plurality of beams includes:
transmitting BSI (beam status information)-RS (reference signal) through the plurality of beams; and
receiving the channel state information including a CQI (channel quality indicator) measured based on the BSI-RS from a terminal that receives the BSI-RS.

10. The method of claim 8, wherein a first pilot and a second pilot that are distinguished by a first orthogonal code among the orthogonal codes among the pilots that belong to the second pilot set use the same resources as a third pilot and a fourth pilot that are distinguished by the first orthogonal code among the pilots that belong to the first pilot set, and the first orthogonal code is a Walsh code.

11. The method of claim 4, wherein the base station manages a plurality of distributed antennas.

12. A method in which a base station allocates pilots in a multiple-antenna communication system, the method comprising:
configuring a first pilot set and a second pilot set that use the same resources and are distinguished by different random numbers;
allocating pilots that belong to the first pilot set and pilots that belong to the second pilot set to a plurality of beams;
determining the pilots allocated to the beams for data streams that are to be multiple transmitted among the plurality of beams; and
allocating the determined pilots among the pilots that belong to the first pilot set and the second pilot set to the data streams that are to be multiple transmitted,
wherein interference between the plurality of beams is calculated prior to allocating the pilot signals to data streams being multiple-transmitted and
wherein the determining of the pilots allocated to the beams for the data streams that are to be multiple transmitted includes:
receiving channel state information regarding the plurality of beams from a terminal;
calculating interference between the plurality of beams based on the channel state information; and
determining the data streams that are to be multiple transmitted based on the interference between the plurality of beams.

13. The method of claim 12, wherein the configuring of the first pilot set and the second pilot set includes:
including some of a plurality of pilots distinguished by at least one of time domain symbols, subcarriers, and orthogonal codes in the first pilot set; and
including the remaining pilots, excluding the pilots that are included in the first pilot set among the plurality of pilots, in the second pilot set.

14. The method of claim 13, wherein a first pilot and a second pilot that are distinguished by a first orthogonal code among the orthogonal codes among the pilots that belong to the second pilot set use the same resources as a third pilot and a fourth pilot that are distinguished by the first orthogonal code among the pilots that belong to the first pilot set, and the first orthogonal code is a Walsh code.

15. The method of claim 12, wherein the receiving of the channel state information regarding the plurality of beams includes:
transmitting BSI (beam status information)-RS (reference signal) through the plurality of beams; and
receiving the channel state information including a CQI (channel quality indicator) measured based on the BSI-RS from a terminal that receives the BSI-RS.

16. The method of claim 12, wherein the random number is a PN (pseudo noise) sequence.

17. The method of claim 12, wherein the base station manages a plurality of distributed antennas.

* * * * *